United States Patent [19]
Okamura et al.

[11] 3,821,445
[45] June 28, 1974

[54] METHOD FOR PROCESSING MEATS

[75] Inventors: Eijiro Okamura, Anjo; Toshikatsu Takahashi, Tokyo, both of Japan

[73] Assignee: Nippon Suisan Kabushiki Kaisha, Tokyo-to, Japan

[22] Filed: Dec. 28, 1971

[21] Appl. No.: 212,984

[30] Foreign Application Priority Data
Dec. 26, 1970 Japan.............................. 45-126005

[52] U.S. Cl.................. 426/370, 426/371, 426/513
[51] Int. Cl... A22c 18/00, A22c 21/00, A22c 25/00
[58] Field of Search............. 99/108, 111, 194, 195; 426/370, 371, 376, 512, 513, 524

[56] References Cited
UNITED STATES PATENTS
2,650,167  8/1953  Garsaud.............................. 99/194
3,432,311  3/1969  Gruner............................ 99/108 X FOREIGN PATENTS OR APPLICATIONS
6,508  5/1970  Japan.................................. 99/108

Primary Examiner—Hyman Lord
Attorney, Agent, or Firm—Wenderoth, Lind & Ponack

[57] ABSTRACT

Grain-sized pieces of meat or chopped meat or fish or mixtures of fish and animal meat can be processed into a solid mass of meat which is very similar to ordinary animal meat in outer appearance as well as mouth feel, wherein the raw meat material is mixed with a quantity of salt and other additives, and then subjected to gradual freezing followed by defrosting and re-freezing operations to denature said solid mass of meat, the defrosting and re-freezing operations being conducted at least once.

3 Claims, 3 Drawing Figures

3,821,445

METHOD FOR PROCESSING MEATS

BACKGROUND OF THE INVENTION

This invention relates to a method for processing grain sized pieces of meats such as that of fish, animals, and poultry in a single or mixed form into a meat block. More particularly, it is concerned with a method for processing such meat into a large mass by adding thereto a quantity of salt and other additives, and denaturing the same through freezing and defrosting operations, the resulting mass of meat giving an outer appearance and touch in the mouth very similar to ordinary edible animal meat.

SUMMARY OF THE INVENTION

It is the primary object of the present invention to provide a method for processing grain sized pieces of meat and/or chopped meat into a large mass having the outer appearance and touch in the mouth which is similar to that of ordinary edible animal meat.

The foregoing object and the details of the present invention will become more apparent from the following description of the invention, when read in connection with the accompanying drawing.

The present inventors have conducted studies and researches on the utilization of grain sized particles of meat which has heretofore been used as raw material for kneaded meat products such as sausage, etc., in the form of a product of a meat block having high commercial value. As a result, they have succeeded in obtaining a large mass of such meat product having an outer appearance and touch in the mouth of ordinary edible animal meat. This has been realized by adding an appropriate quantity of salt to the abovementioned grain sized particles of meat and subjecting the raw material meat to denaturing through the single stage of gradual freezing and defrosting operations, or repeated gradual freezing and defrosting operations.

In the present invention, the meat designates fish meat, animal meat, and poultry meat, and, in the case of using the fish meat alone as the raw material, it is possible to obtain the appearance and touch in the mouth as those of animal and poultry meat by appropriately regulating the conditions for the denaturing.

The adding quantity of salt to the raw material meat such as pollack, haddock, pork, etc., ranges from 0.5 to 3.5 percent by weight and the mixture of the raw material meat is mashed and kneaded. When the added quantity of salt is below 0.5 percent by weight, no adhesiveness occurs within the meat particles when the material is mashed with the consequence that desired touch in the mouth cannot be obtained. On the other hand, when the added quantity of salt exceeds 3.5 percent by weight, the taste in the mouth is spoiled.

The kneaded material meat is then shaped into a desired shape, after which it is subjected to freezing. This freezing is to produce the appropriate size of the ice crystal within the meat to cause the meat block to be denatured. The freezing is carried out gradually or slowly at an appropriate temperature level ranging from −6°C to −30°C.

The gradual freezing as used in the present invention is distinguished from rapid freezing based on the following definition:

1. gradual freezing ... foodstuffs are frozen in a refrigerating chamber with static air at a freezing temperature;
2. rapid freezing ... foodstuffs are frozen in a refrigerating chamber with both static air at a freezing temperature and with direct contact of the foodstuffs to freezing pipes.

Figure 2:
FIG. 2 is a photographic representation showing the texture of ordinary frozen mash of fish meat.
Figure 3:
FIG. 3 is a photographic representation showing the texture of a meat block formed from grain sized pieces of meat according to the process of the present invention.

Other methods of freezing than the gradual cooling method such as, for example, freezing at a temperature of −5°C or colder, is not capable of producing the desired ice crystals, hence the intended denaturing cannot be obtained within the meat block. On the other hand, the rapid freezing does not produce the required animal meat texture, because the ice crystal produced thereby are extremely fine (cf. FIG. 2).

Figure 1:
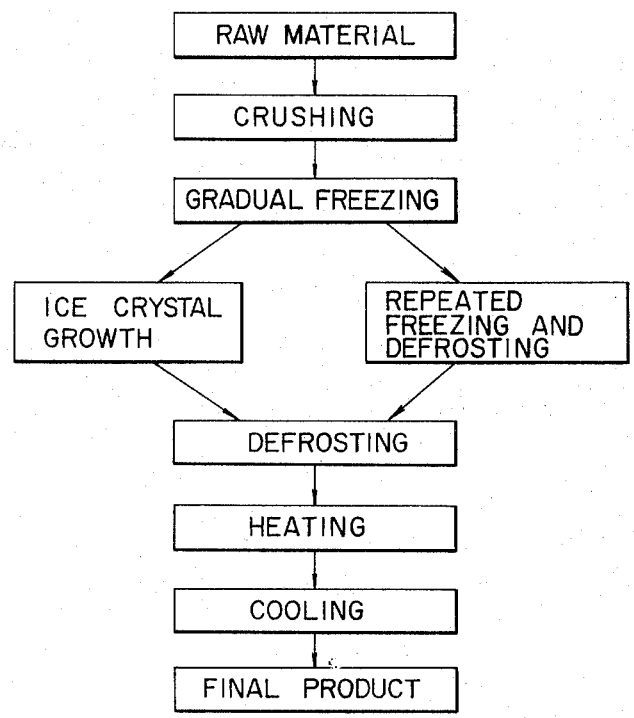
FIG. 1 is a flow sheet showing the process steps of producing the meat block according to the present invention.

The meat block, in which the desired ice crystals have been formed by the gradual freezing, is then subjected to defrosting (See the flow sheet in FIG. 1). Preferably the temperature for the defrosting is from 3°C to 20°C.

The kneaded meat block thus defrosted is again frozen under the same conditions as mentioned in the foregoing. This freezing and defrosting operations are repeated several times until the meat protein is denatured.

Further, the present inventors noticed that the ice crystals grow during storage of the meat block at such low temperature with the consequent change in the texture of the meat, as described above, and, based on this finding, they have succeeded in obtaining the kneaded meat block in a denatured form by storing it at a low temperature condition of from −6°C to −20°C subsequent to the gradual freezing. This denaturing is perfected after storing the meat block for a period of from 2 to 5 days.

The kneaded meat block which has been attained by denaturing through the freezing step as mentioned in the above, is subjected to defrosting followed by the further process steps of heating, sterilization, and cooling to be made into the final product.

The meat block thus-produced may have a different outer appearance and touch in the mouth depending on the class of raw material used, conditions for the denaturing, freshness of the raw material, the added quantity of salt, and other factors.

The present invention not only processes fish meat, animal meat, and poultry meat in its single form, but also processes these meats in mixed form under the same conditions as aforementioned, in which case the meat product gives a taste which is somewhat different from that produced from any single kind of the abovementioned raw material meats. It is furthermore possible to add soy bean protein, wheat protein, condiments, and flavoring agent to the product.

In order to enable skilled persons in the art to reduce the invention into practice, the following preferred examples are presented. It should, however, be noted that

PREFERRED EMBODIMENT

EXAMPLE 1

10 kg of mashed meat of pollack, 250 g of salt, and a small quantity of flavoring agent and condiments were mixed together and kneaded by a masher. The mashed raw material meat was immediately shaped into a plate-shaped product having 20 m/m in thickness, pan-dressed, and kept in a refrigerator maintained at a temperature of −6°C for 10 hours for the gradual freezing, after which it was taken out of the refrigerator to be defrosted for 4 hours at a temperature of 20°C. Upon completion of the defrosting, the meat block was again subjected to the repeated freezing and defrosting under the same conditions as in the previous treatment, after which it was cut into small cubes of 2 cm$^3$ to be made into ham in accordance with the ordinary ham making method. The fish meat ham thus-produced was presented for the panel test to be compared with animal meat ham for its touch in the mouth. The touch was recognized to be almost the same as that of the animal meat ham. No significant difference could be recognized.

EXAMPLE 2

10 kg of mashed meat of pollack, 350 g of salt, and a small quantity of flavoring agent, condiments, and coloring agent were mixed together and kneaded in a silent cutter. The kneaded raw material meat was immediately filled in a casing tube of vinylidene chloride having 60 m/m in diameter, and the encased meat was kept in a refrigerator maintained at a temperature of −20°C for gradual freezing. After a lapse of 5 hours, it was taken out of the refrigerator, and further placed in a different refrigerator maintained at −6°C for 2 days to accelerate the growth of ice crystals. Thereafter, it was defrosted for 4 hours at a room temperature, then heated to 85°C, and cooled.

The meat block thus-obtained was compared for its touch in the mouth with that of red meat of mutton. Substantially the same touch could be felt by 20 test panellers with the rate of risk of 5 percent. No significant difference could be recognized.

EXAMPLE 3

50 g of salt was added to 10 kg of mashed meat of haddock and the material meat was kneaded by a silent cutter. The kneaded meat was immediately formed into a plate shape of 50 m/m thick, pan-dressed, and kept in a refrigerator at −15°C for the required gradual freezing. After 7 hours, it was taken out of the refrigerator, and further placed in a separate refrigerator maintained at −10°C for 2 days to accelerate the growth of ice crystals. The meat block in a frozen state was cut by a band-saw into a stick of 10 m/m thick, which was then breaded and fried as is usually done.

The fried fish meat was recognized to give a different touch in the mouth from that of the generally known boiled fish paste (as it is called "kamaboko" in Japanese). The rate of risk was 1 percent per 20 test panellers. No significance could be recognized.

Further, when this fried fish meat was compared for its touch in the mouth with that of fried fillet of haddock, the touch was recognized to be almost the same as that of the fillet. The rate of risk was 5 percent per 20 test panellers without any significant difference being recognized.

EXAMPLE 4

230 g of salt was added to 10 kg of chopped beef meat, and kneaded, after which the kneaded meat was shaped into a planar form of 60 m/m thick, then pan-dressed, and kept in a refrigerator maintained at −20°C for the required gradual freezing. After a lapse of 24 hours, the material meat was taken out of the refrigerator and transferred to another refrigerator maintained at −10°C to accelerate the growth of ice crystals for a period of 3 days.

When the solid meat block thus obtained was baked and tasted, it was found that the touch in the mouth was very similar to, but somewhat softer than, that of ordinary beef steak. The rate of risk was 5 percent per 15 test panellers without any significant difference being recognized.

The same preferable touch could be realized when the growth promotion of the ice crystal was conducted for 30 days.

EXAMPLE 5

4 kg of chopped pork meat, 6 kg of grain size particles of mutton meat, and 250 g of salt were mixed and kneaded. The kneaded meat was then packed in a casing tube of vinylidene chloride film of 100 m/m in diameter, and the encased material meat was placed in a refrigerator maintained at a temperature of −30°C for the required gradual freezing. After a lapse of 20 hours, it was taken out of the refrigerator, defrosted for 7 hours at a room temperature (20°C), and again subjected to gradual freezing at a temperature of −30°C.

After repetition of the same freezing and defrosting operations, it was left for 10 hours at room temperature (20°C) so that it might attain its shape, thereafter heated at 80°C for 40 minutes. The meat product thus-obtained was baked and tasted. The touch in the mouth was found to be close to that of lamb meat and to be in of a very mild taste.

When it was compared with mutton, the rate of risk was recognized to be 1 percent per 20 test panellers without any significant difference being recognized.

EXAMPLE 6

5 kg of grain sized particles of fish meat, 3 kg of chopped pork meat, and 2 kg of soy bean protein were mixed, to which 270 g of salt was added and kneaded, after which it was shaped into a planar form of 100 m/m thick, pan-dressed, and placed in a refrigerator maintained at −15°C for the gradual freezing. After a lapse of 18 hours, it was taken out of the refrigerator and transferred to another refrigerator maintained at −10°C to accelerate the growth of ice crystals for 5 days.

The solid meat thus-obtained was baked and tasted. It was found that the touch in the mouth was just the same as that of animal meat, and its taste was mild.

Also, ham was made from this solid meat by the ordinary method, and compared with meat ham available in the general market. The rate of risk was 1 percent per 20 test panellers without any significant difference being recognized.

EXAMPLE 7

7 kg of mashed meat of haddock and 3 kg of chopped chicken meat were mixed, to which 100 g of salt, a quantity of flavoring agent and condiment were added, and the mixture was kneaded by a silent cutter. The kneaded material meat was immediately stuffed into a casing tube of a vinylidene chloride film of 200 m/m in diameter and placed in a refrigerator maintained at −30°C for the required gradual freezing. After a lapse of 20 hours, it was taken out of the refrigerator and defrosted for 7 hours at a room temperature, thereafter it was again subjected to gradual freezing at the same temperature conditions.

After repetition of the same operations, the meat block was left for 16 hours in a room temperature condition to attain sufficient setting of the shape thereof, and then heated at 90°C for 30 minutes.

The meat block thus-obtained was baked and tasted. It was found that the touch and taste in the mouth were rather similar to that of chicken meat with a milder taste, which was favored by all of the 15 test panellers.

EXAMPLE 8

8 kg of mashed meat of pollack was mixed with 2 kg of wheat protein, to which 270 g of salt, a quantity of flavoring agent, condiment, and coloring agent were added and kneaded. Thereafter, the kneaded material meat was immediately shaped in a plate shape of 40 m/m thick, pan-dressed, and placed in a refrigerator maintained at −20°C for the required gradual freezing. After 18 hour's lapse, it was transferred into another refrigerator maintained at −10°C and placed therein for 5 days to attain sufficient growth of ice crystal.

The solid meat block thus-obtained was baked and tasted. It was found that the touch in the mouth thereof was similar to that of chicken meat with 5 percent of the rate of risk per 20 test panellers. No significant difference was recognized.

What we claim is:

1. A method for the production of a meat product from chopped or grain-sized pieces of animal, poultry, or fish meat, or mixtures thereof, which comprises mixing and kneading the chopped or grain-sized pieces of the raw meat material; adding salt in an amount of from 0.5 to 3.5 percent by weight of the raw meat material to produce the required adhesiveness among the pieces of the raw meat material; shaping the kneaded mixture into a desired shape; subjecting the shaped meat material to denaturing by gradually freezing the shaped meat material with static air at a temperature within the range of from −6°C to −30°C for a period of from 5 to 24 hours to produce ice-crystals within the meat material; and then defrosting the frozen meat material at a temperature of from 3°C to 20°C for a period of from 4 to 7 hours, said freezing and defrosting steps being carried out at least once, to provide a meat product which is similar to natural animal meat in appearance and mouth feel.

2. A method according to claim 1, wherein the freezing and thawing steps are carried out more than once.

3. A method according to claim 1, wherein upon completion of the gradual freezing step and prior to the defrosting step, said frozen meat material is maintained at a temperature of −6°C to −20°C for a period of from 2 to 5 days to accelerate the growth of ice-crystals within said frozen meat material.

* * * * *